(12) United States Patent
Zhou et al.

(10) Patent No.: US 10,409,235 B2
(45) Date of Patent: Sep. 10, 2019

(54) SEMANTIC MEDICAL IMAGE TO 3D PRINT OF ANATOMIC STRUCTURE

(71) Applicant: Siemens Healthcare GmbH, Erlangen (DE)

(72) Inventors: Shaohua Kevin Zhou, Princeton, NJ (US); Bernhard Geiger, Cranbury, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 727 days.

(21) Appl. No.: 14/539,051

(22) Filed: Nov. 12, 2014

(65) Prior Publication Data

US 2016/0129637 A1 May 12, 2016

(51) Int. Cl.
*G05B 15/02* (2006.01)
*G06T 19/20* (2011.01)
*B33Y 50/00* (2015.01)

(52) U.S. Cl.
CPC .............. *G05B 15/02* (2013.01); *B33Y 50/00* (2014.12); *G06T 19/20* (2013.01); *G06T 2210/41* (2013.01); *G06T 2219/2021* (2013.01)

(58) Field of Classification Search
CPC ..... B33Y 50/00; G05B 15/02; G06T 2210/41; G06T 19/20; G06T 2219/2021
See application file for complete search history.

(56) References Cited

U.S. PATENT DOCUMENTS

| 2002/0007294 | A1* | 1/2002 | Bradbury | A61F 2/30942 |
| | | | | 705/2 |
| 2004/0243481 | A1* | 12/2004 | Bradbury | G16H 50/50 |
| | | | | 705/26.1 |
| 2005/0078857 | A1* | 4/2005 | Park | A61B 5/0002 |
| | | | | 382/128 |
| 2006/0094951 | A1* | 5/2006 | Dean | A61F 2/30942 |
| | | | | 600/407 |

(Continued)

FOREIGN PATENT DOCUMENTS

| EP | 2584534 | 4/2013 |
| KR | 20130138739 | 12/2013 |

(Continued)

OTHER PUBLICATIONS

3D-Doctor User's Manual 3D Imaging, Modeling and Measurement Software, Able Software Corp., http://www.ablesw.com, pp. 1-269, 2012.

(Continued)

*Primary Examiner* — Tuan C Dao

(57) ABSTRACT

The process of creating a 3D printer ready model of patient specific anatomy is automated. Instead of manual manipulation of the 3D mesh from imaging to create the 3D printer ready model, an automated manipulation is provided. The segmentation may be automated as well. In one approach, a transform between a predetermined mesh of anatomy and patient specific 3D mesh is calculated. The predetermined mesh has a corresponding 3D printer ready model. By applying the transform to the 3D printer ready model, the 3D (Continued)

printer ready model is altered to become specific to the patient. In addition, target manipulation that alters semantic parts of the anatomical structure may be included in 3D printing.

19 Claims, 2 Drawing Sheets

(56) References Cited

U.S. PATENT DOCUMENTS

| | | | |
|---|---|---|---|
| 2007/0127798 A1* | 6/2007 | Chakraborty | G06F 19/321 382/128 |
| 2008/0117205 A1* | 5/2008 | Storti | G06T 17/00 345/420 |
| 2010/0172567 A1* | 7/2010 | Prokoski | A61B 5/0064 382/132 |
| 2012/0015330 A1* | 1/2012 | Zhivago | A61C 13/0004 433/215 |
| 2013/0307848 A1 | 11/2013 | Tena et al. | |
| 2014/0162233 A1* | 6/2014 | Hultgren | A61C 13/34 434/270 |
| 2014/0267116 A1* | 9/2014 | Weiner | G06F 3/0416 |
| 2015/0216732 A1* | 8/2015 | Hartwell | A61F 13/00021 |

FOREIGN PATENT DOCUMENTS

| | | |
|---|---|---|
| WO | WO2004110309 A3 | 12/2004 |
| WO | WO2010030170 | 3/2010 |
| WO | WO2010060170 A1 | 6/2010 |

OTHER PUBLICATIONS 3D printing in medicine, 3D printing heart, 3D HOPE Medical, http://3dhopemedical.com, pp. 1-3, 2014.
Chinese Office Action dated Oct. 23, 2017 in corresponding Chinese application No. 201510768893.9.

* cited by examiner

SEMANTIC MEDICAL IMAGE TO 3D PRINT OF ANATOMIC STRUCTURE

BACKGROUND

The present embodiments relate to three-dimensional (3D) printing of anatomic structure from medical imaging.

3D printing prints a three-dimensional object from a 3D model primarily through additive processes in which successive layers of material are laid down under computer control. While 3D printing is able to print any 3D object, printing 3D anatomical structure is of significant interest to patients, physicians and surgeons. Clinically, surgeons may use the printed models for planning surgery. Parents-to-be may enjoy a 3D model of their fetus.

The 3D anatomical model may be derived from a 3D medical scan, such as a scan using computed tomography, magnetic resonance, or ultrasound. The 3D medical image scan is provided to a service, which extracts the anatomical model from the 3D scan. A person manually extracts the anatomical model from the medical scan. The extracted model is commonly saved in a 3D mesh format. Not every mesh may be directly printed by a 3D printer. For example, directly printing a 3D ball is difficult. A supporting base should be designed and used in combination with the 3D ball. For other structures (e.g., a pyramid), the mesh needs to be oriented appropriate for 3D printing (e.g., the pyramid is oriented to be printed from the base to peak). Accordingly, the person manually manipulates the 3D mesh so that the 3D mesh is appropriate for 3D printing. 3D printing is then used to print the anatomy. Current image-to-3D-print is a mostly time consuming and expert requiring manual process, so may not be deployed for general use.

BRIEF SUMMARY

By way of introduction, the preferred embodiments described below include methods, systems, instructions, and computer readable media for preparing for three-dimensional printing from medical scan data. The process of creating a 3D printer ready model of patient specific anatomy is automated. Instead of manual manipulation of the 3D mesh from imaging to create the 3D printer ready model, an automated manipulation is provided. The segmentation may be automated as well. In one approach, a transform between a predetermined mesh of anatomy and patient specific 3D mesh is calculated. The predetermined mesh has a corresponding 3D printer ready model. By applying the transform to the 3D printer ready model, the 3D printer ready model is altered to become specific to the patient.

In a first aspect, a method is provided for preparing for three-dimensional printing from medical scan data. Scan data representing an anatomic structure of a patient is acquired from a medical imaging system. A patient mesh of a surface of the anatomic structure of the patient is created. A processor calculates a transform of the patient mesh to a template mesh. The processor applies the transform to a three-dimensional print model corresponding to the template mesh, resulting in a transformed three-dimensional print model. The transformed three-dimensional print model is output to a three-dimensional printer.

In a second aspect, a non-transitory computer readable storage medium has stored therein data representing instructions executable by a programmed processor for preparing for three-dimensional printing from medical scan data. The storage medium includes instructions for: warping between a patient-specific representation of anatomy and a predetermined representation of the anatomy; and altering a three-dimensional print construction for the predetermined representation of the anatomy based on the warping.

In a third aspect, a system is provided for preparing for three-dimensional printing from medical scan data. A medical imaging system is configured to scan a patient. A processor is configured to segment structure of the patient from the scan and to create a model for three-dimensional printing from the segmented structure. The segmentation and creation occur free of user input during the segmentation and creation.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

An automatic image-to-3d-print process extracts mesh models of semantic structures, such as organs, bones, airways, or vasculatures, automatically from a 3D medical scan. The 3D mesh is automatically prepared for 3D printing. The automated workflow not only enables efficiency but also brings standardization.

Figure 1:
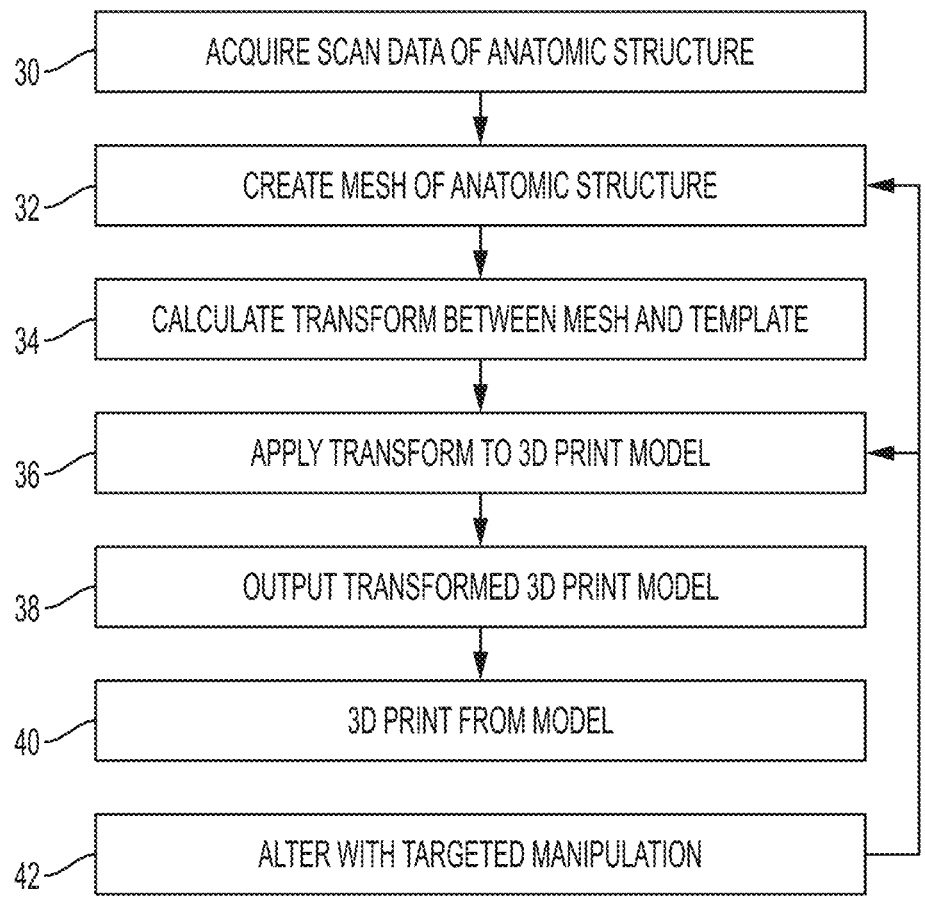
FIG. 1 is a flow chart diagram of one embodiment of a method for preparing for three-dimensional printing from medical scan data.

FIG. 1 shows a method for preparing for three-dimensional printing from medical scan data. The method is performed by the system of FIG. 4, a processor, a medical imaging system, a different system, or combinations thereof. A medical imaging scanner or a memory storing data originally acquired by a medical imaging scanner performs act 30. A processor implements software to perform acts 32-38 and 42. The processor is part of or separate from (e.g., sever, workstation, or personal computer) the medical imaging scanner. A 3D printer performs act 40.

The input to the workflow or method is scan data or a point set (e.g., segmented mesh) derived from scan data. The anatomy of interest may be indicated, such as selecting the anatomy form a list. For example, the user selects an application (e.g., liver), which causes loading of templates, classifiers, or other software used for image-to-3D print of the liver. Alternatively, the processor identifies an organ of interest, such as by locating a diagnosis of the patient in the medical record. The identified organ is used to load the corresponding templates and/or segmentation.

The method is performed in the order shown or a different order. Act 42 is performed after act 32 or before act 38, such as being performed as part of act 32 or before act 34 or being performed before, as part of, or after act 36.

Additional, different, or fewer acts may be provided. For example, acts 30, 32, 40, and/or 42 are not performed. As another example, acts for conversion of a transformed 3D print model to a format for a specific 3D printer are provided. The method is one example of automated image-to-3D print, but other methods with different steps may be provided, such as directly transforming a 3D printing model for a specific anatomy to scan data of a patient.

In act 30, scan data is acquired. The scan data is acquired by scanning a patient in three dimensions (e.g., volume scanning) with a medical imaging system. Any scanning may be used. For example, x-rays are used by a computed tomography (CT) system to scan the patient. In another example, magnetic resonance is used by a magnetic resonance (MR) imager or ultrasound is used by an ultrasound scanner. Positron emission, single photon emission computed tomography, or other scanning and corresponding imaging systems may be used. The scan data is CT, MR, ultrasound or other scan data. Alternatively, the scan data is acquired from a memory, such as loading the scan data from a picture archiving and communications system (PACS). Data previously acquired with a medical imaging system may be loaded as the scan data.

The scan data is at any stage of processing. For example, the scan data is raw data (e.g., as a series of frames of raw data from CT, a set of k-space data from MR, or acoustic beamformed data in an acoustic grid that may be reconstructed into a volume) or data as detected from scanning the patient. As another example, the data is processed, such as filtered or image processed. The scan data may be processed to be a set of voxels, point data, or segmented meshes. The scan data may be image data. Image data may refer to an actually displayed image or to the frame of data for generating the display.

The scan data is acquired as a frame of data. Other groupings than frames may be used. The frame of scan data represents a region (e.g., volume) within a patient. The region includes any anatomic structure, such as an organ, tissue, bone, or vasculature. Other non-anatomic structures may be represented, such as an implant or catheter. The region may include only part of one or more anatomic structures. By scanning the region, data representing anatomy is acquired. Any anatomic structure may be represented. For purposes of example, the scan region is a lower torso of a patient and includes the liver as an anatomic structure.

In act 32, a patient mesh of a surface of anatomic structure of the patient is created. An anatomic structure of interest is identified in the scan data. The entire anatomic structure or part of the anatomic structure is identified. For example, the liver is identified. The user may input an identification on an image generated from the scan data. Alternatively, a processor identifies the anatomic structure, such as applying a classifier to locate the liver. The identification distinguishes locations for one type of anatomy from locations for other types of anatomy.

In one embodiment, the anatomic structure is segmented from the scan data. The scan data representing the anatomic structure are distinguished from other locations. The segmenting may identify the locations, may extract just scan data for the locations of the anatomic structure, or may mask scan data for locations not of the anatomic structure.

The segmentation is specific to the type of anatomy or distinguishes different types of anatomy. Any now known or later developed segmentation may be used. For example, thresholding, gradient analysis, edge detection, or other image processing is performed to identify and segment locations of a specific anatomical structure represented in scan data. In one embodiment, the segmentation uses a machine-learnt classifier. Using any of various input features, such as Haar wavelets, gradients, or the scan data itself, and labeled truth (e.g., segmented anatomy) for training, a processor learns to distinguish a given type of anatomy from other information. Bayesian, neural network, support vector machine, probabilistic boosting tree, or other machine learning may be used. Once trained, a matrix or other representation of the machine-learnt classifier is applied to scan data for a specific patient. The scan data is processed to derive or calculate the input feature vector. Based on this input, the classifier indicates locations for the anatomy of interest. The machine-learnt classifier is trained to segment a specific type of anatomic structure. For a different anatomic structure, a different machine-learnt classifier is used. Alternatively, the classifier is trained to segment multiple different types of anatomic structures.

The segmenting is performed without user input other than an indication of the classifier or segmentation to use. For example, the user indicates segmentation of the liver. The processor then locates the liver in the scan data without further user input during the segmenting. Alternatively, an image based on the scan data is displayed, and the user inputs one or more seed points or traces. The processor then completes the segmentation. In yet other alternatives, the user manually segments.

The segmentation indicates locations corresponding to the anatomic structure. These locations are used to create the patient mesh or mesh of the anatomic structure. The mesh provides point or discrete representation of the anatomic structure. In one embodiment, the surface of the anatomic structure (e.g., exterior surface or exterior and any interior surfaces) is found. The locations may be low pass filtered and then a gradient process applied to identify the surfaces. Other surface finding locations may be used. Each voxel along the surface is a node in the mesh. Alternatively, the mesh is formed at any resolution assigning nodes and connecting lines to the surface. The mesh of the anatomic structure is a patient mesh model, designated M herein.

The mesh may be used for 3D printing. However, the orientation of the mesh based on the orientation of the anatomic structure in the scan data may not be stable for 3D printing. For example, a narrow or rounded part of the liver may be down. As a result, the printed part may shift or rotate during printing, causing failure of the printing. As another example, insufficient structural support may be provided for thin surfaces supporting thicker or heavier portions, resulting in collapse. In yet another example, the mesh may be only one outer surface, resulting in 3D printing of a solid object, wasting printing material (e.g., plastic).

Rather than using the created mesh of the anatomic structure directly for 3D printing, the mesh is used to alter a 3D print model. The 3D print model is a template for the same type of anatomic structure, but is not specific to the patient of interest. The 3D print model incorporates alterations to avoid collapse or faulty printing, such as re-orienting the anatomy, adding a base, adding support structure, and/or optimizing thickness. The mesh of the specific patient is used to alter the 3D print model, providing a transformed 3D print model, N, incorporating 3D print considerations but specific to the patient.

Acts 34-38 are provided to transform a 3D print model, $\underline{N}$, based on the segmented, patient-specific mesh M. In act 34, a relationship of the patient mesh M is found with a template mesh, $\underline{M}$, corresponding to the anatomy of the 3D print model, $\underline{N}$. In act 36, the relationship is used to alter the 3D print model, $\underline{N}$, to provide the transformed 3D print model, N. Other approaches may be used, such as transforming anatomy specific parts of the outer surface of the 3D print model to the patient mesh directly.

In act 34, a transform between the patient mesh and a template mesh is calculated. A processor determines the relationship or distortion between the meshes. The patient mesh is fit to the template mesh or the template mesh is fit to the patient mesh. The transform indicates changes or differences of one set of nodes to another set of nodes (e.g., match the meshes).

In one embodiment, the template mesh is from a model of the anatomy or segmented from another patient. For example, the same segmentation or creation of the mesh for act 32 is applied to scan data of a different patient, such as a patient with the anatomy in a healthy state or in an unhealthy state similar to the current patient. The resulting mesh is a template or predetermined mesh. An expert may create a 3D print model from that mesh, providing the 3D print model $\underline{N}$. The template 3D print model, $\underline{N}$, includes the orientation, base, support structure, or other optimized criteria as determined by the expert and is directly related to the template mesh, $\underline{M}$, in a known way (e.g., rotated, scaled, thickened, added to, subtracted from, and/or other alterations). Based on the manually created 3D print model, $\underline{N}$, using the template mesh, $\underline{M}$, the patient mesh, M, may be used to create a patient specific, transformed 3D print model, N.

The template 3D print model, $\underline{N}$, is created manually or may be created in an automated fashion. The alterations of the template mesh, $\underline{M}$, to provide the template 3D print model, $\underline{N}$, may be limited, controlled, or selected. For example, material consumption may be optimized, such as minimized. Interior portions may be designated as hollow. As a result, these alterations are incorporated into the transformed 3D print model, N.

To add the patient specific aspect, the patient mesh M is warped to the template mesh, $\underline{M}$. Both meshes represent the same anatomic structure without consideration for 3D printing. A non-rigid transform between the meshes is calculated. The differences or fit of the patient-specific representation of the anatomy to the predetermined representation of the anatomy are found. The transform to convert one mesh to another similar mesh is determined. Once the mesh M is segmented using the same automatic segmentation method used for the template mesh with a different patient, a transformation or warping function T that morphs $\underline{M}$ to M, that is $T(\underline{M})=M$, is derived.

Figure 2:
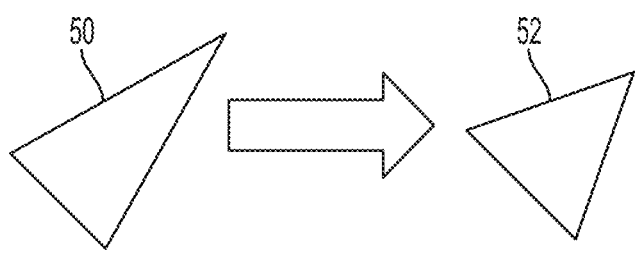
FIG. 2 shows an example of transform between a patient-specific mesh and a template mesh.

FIG. 2 shows a simplified example. The larger triangle 50 is a mesh representing anatomy, such as an enlarged anatomic structure of a patient. The smaller triangle 52 is a predetermined mesh representing an average or healthy anatomy of a different patient or a model. The transform to convert the mesh 50 to the mesh 52 is found. The transform is a deformation.

Any transform calculation may be used. For example, non-rigid warping is calculated using a thin plate spline. Other non-rigid transforms may be calculated, such as coherent point drift, multiquadrics, or diffeomorphism. The transform indicates the differences associated with a fit of the meshes, M and $\underline{M}$, together. The processor calculates the transform representing the deformation to fit the meshes.

For the discrete representation, the points in mesh are matched to the closest points in the other mesh. Alternatively, the meshes are treated as continuous surfaces and points in one mesh are fit to the surface defined by the other mesh. In yet other alternatives, two surfaces are fit together.

In act 36, the processor applies the transform to the template 3D print model, $\underline{N}$. The 3D print model is created using the template mesh of the anatomy. By applying the transform, the 3D print model is transformed to account for the deformations or differences specific to the patient while maintaining the expert created 3D print characteristics (e.g., orientation, base, reinforcing, optimization of material, and/or other considerations). The transformation is of the parts of the 3D print model representing the anatomy. The parts added for 3D printing remain the same, such as the change in orientation, addition of a base, thinning, and/or thickening.

The 3D print ready model of the predetermined representation of the anatomy is converted into a 3D print ready model specific to the patient. The 3D print model is adjusted for the anatomic structure of the patient. By applying the transform, the 3D print model is warped in a manner corresponding the warping of the meshes. The construction is altered to incorporate the patient-specific characteristics. The template 3D print model is transformed.

The warping that fits the patient mesh, M, to the template mesh, $\underline{M}$, is applied to the template 3D print model, $\underline{N}$, to create the transformed 3D print model, N. The same transformation T is applied to the 3D-print model, $\underline{N}$, to obtain the desired 3D-print model N for the patient, that is $N=T(\underline{N})$. The result of the application of the transform is the transformed 3D print model, N.

Figure 3:
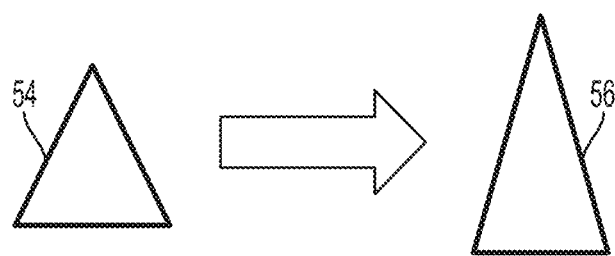
FIG. 3 shows an example of applying the transform to a 3D printer ready model, resulting in a 3D printer ready model specific to a patient.

FIG. 3 shows a simplified example. The 3D print model 54 of the predetermined mesh 52 (FIG. 2) has been rotated to put the base flat on a downward surface and the walls thickened to avoid collapse. The transform calculated for FIG. 2 is applied to this 3D print model 54 to create the patient-specific 3D print model 56. The transform is a deformation of the smaller mesh to the larger patient specific mesh. By applying that transform, the 3D print model 54 is enlarged to represent the enlarged patient mesh 50, but the orientation and thicker was of the 3D print model are maintained in the transformation.

In act 38, the transformed 3D print model is output. The output is a patient-specific, transformed model ready for 3D printing. The output may be formatted for a specific 3D printer (e.g., G-code the) or 3D printers in general (STL file), such as having been sliced. Alternatively, the output is formatted as a computer assisted design file or other data structure that may be converted for 3D printing through slicing or other process.

The transformed 3D print model, as output, includes a combination of the anatomic structure warped to represent a specific patient and characteristics for 3D printing. The transformed 3D print model may include a base, added support structure, orientation for printing rather than for imaging, thinned portions, hollowed portions, and/or other 3D print considerations. The transformed 3D print model has anatomy of the patient, but includes differences from that anatomy appropriate for 3D printing without having manually added the differences during the image-to-3D print process for that patient.

The output is to a 3D printer. Alternatively, the output is to a memory or transfer over a network. In yet another embodiment, the output is to a workstation or computer assisted design system for display of the transformed 3D printer model. The model as transformed may be viewed to confirm readiness to print and/or for manual alteration.

In act 40, the transformed 3D print model is 3D printed. The model may be reformatted or compiled into instructions for printing. Alternatively, the model includes the compiled instructions. In response to the model, the 3D printer prints out a plastic, metal, paper, or other material representation of the anatomy of the patient. One or more parts, such as the base or added support structure, may be removable or colored differently. For example, added support is printed in a clear or partially transparent material while the anatomy is printed in one or more other, more opaque colors. The base is removable, such as by clipping.

Other models may be printed. For example, the 3D print model without transform represents a healthy anatomy. This 3D print model is printed for comparison with the transformed 3D print model representing the patient's anatomy.

In act 42, the 3D print model is altered to account for differences not due to the patient-specific anatomy and not due to 3D printing. A targeted manipulation deviating from the patient-specific representation of the anatomy is provided. For example, a predicted progression of disease or other pathology is incorporated. The model is altered to show the predicted state after a period. As another example, a facial expression of a fetus is altered to a smile or other expression.

The targeted manipulation is performed by transformation. The transformation is of the patient mesh before fitting to the template mesh, of the transform fitting the meshes, is of the template 3D print model, or of the transformed 3D print model. To avoid warping removing the targeted manipulation, the transform for the targeted manipulation is applied to the patient mesh before calculation in act 34, applied to the transform between the meshes, or applied to the transformed 3D print model after act 36.

A transformation resulting in a change for the targeted manipulation is applied. One or more parts of the mesh or surfaces are altered. Semantic parts of the anatomic structure are altered. The parts of the anatomy to be altered are identified, such as by a classifier or labeling stored for the template mesh or 3D print model. Once identified, the appropriate alteration, such as adjusting the surface, is applied.

A library of possible transformations may be used. The user selects the transformation to be applied from the library. For example, a set of known transformations $\{T_1, T_2, \ldots, T_n\}$ to deform the model M is provided for targeted manipulation. In one example, once a fetal face mesh model is extracted from a medical scan (e.g., extracted from 3D ultrasound), one or more of the known transformations $\{T_1, T_2, \ldots, T_n\}$ are used to deform the patient mesh, M. Each transformation $T_i$ may render the effect of different expressions, such as smiling, crying, angry, laughing, or others. The anatomical structures are known semantically, such as knowing the locations of eyes, mouth, nose, or other through classification or indications on the predetermined model. By manipulating the semantic parts, different facial expressions are simulated. In other examples, different pathologies for the anatomy are simulated.

Figure 4:
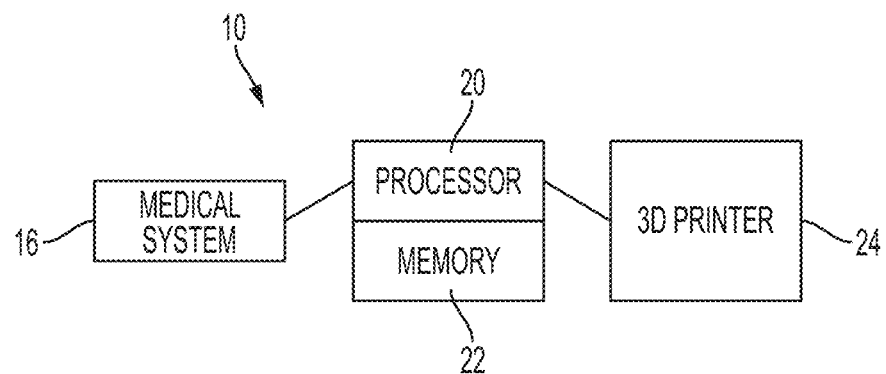
FIG. 4 is a block diagram of one embodiment of a system for preparing for three-dimensional printing from medical scan data.

FIG. 4 shows a system 10 for preparing for three-dimensional printing from medical scan data. The system 10 includes a medical imaging system 16, a processor 20, a memory 22, and a 3D printer 24. Additional, different, or fewer components may be provided. For example, a network or network connection is provided, such as for networking with a medical imaging network or data archival system. As another example, a user interface is provided. In yet another example, the medical system 16 is not provided. The data representing the patient is obtained from the memory 22. In other examples, a display is provided for displaying the transformed 3D printer model of the anatomy or images derived from the scan data.

The processor 20 and memory 22 are part of the medical imaging system 16 or other system. Alternatively, the processor 20 and/or memory 22 are part of an archival and/or image processing system, such as associated with a medical records database workstation or server. In other embodiments, the processor 20 and/or memory 22 are a personal computer, such as desktop or laptop, a workstation, a server, a tablet, a network, or combinations thereof.

The medical system 16 is any now known or later developed medical imaging system or scanner. For example, the medical system 16 is a computed tomography or other x-ray system (e.g., fluoroscopic). An x-ray source and detector are positioned opposite each other and adjacent to a patient and may be moved about the patient for scanning. In one embodiment, the medical system 16 is a spiral or C-arm computed tomography system. In other examples, the medical system 16 is a magnetic resonance, positron emission, ultrasound, single photon emission computed tomography, or other imaging system for scanning a patient.

The medical system 16 is configured by stored settings and/or by user selected settings to scan a patient or a portion of the patient. The scan occurs by transmitting and receiving or by receiving alone. By positioning relative to the patient, aiming, and/or detecting, the anatomy is scanned. For example, the liver is scanned. Other information, such as from other anatomy, may or may not be acquired as well.

The memory 22 is a graphics processing memory, video random access memory, random access memory, system memory, cache memory, hard drive, optical media, magnetic media, flash drive, buffer, database, combinations thereof, or other now known or later developed memory device for storing scan data. The memory 22 is part of the imaging system 16, a computer associated with the processor 20, a database, another system, a picture archival memory, or a standalone device.

The memory 22 stores the scan data representing a region of a patient. Multiple frames of data may be stored or a frame of voxel data is stored. The region is a three-dimensional region. The region is of any part of the patient, such as a region within the chest, abdomen, leg, head, arm, or combinations thereof. The scan data is from scanning the region. The data represents the anatomy in the region.

The memory 22 may store processed data. For example, filtered scan data, image processed data, segmentation, created mesh, a transform, a predetermined mesh, and/or a predetermined 3D printer model of anatomy are stored.

The memory 22 or other memory is alternatively or additionally a computer readable storage medium storing data representing instructions executable by the programmed processor 20 for preparing for three-dimensional printing from medical scan data. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts, or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 20 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for creating a patient-specific 3D print model from image or scan data of the patient. The processor 20 is a single device or multiple devices operating in serial, parallel, or separately. The processor 20 may be a main processor of a computer, such as a laptop or desktop computer, or may be a processor for handling some tasks in a larger system, such as in an imaging system. The processor 20 is configured by instructions, design, firmware, hardware, and/or software to be able to perform the acts discussed herein.

The processor 20 is configured to segment structure of the patient from the scan. Data representing the volume is processed to find locations and/or surfaces of anatomic structures or parts of anatomic structures. Any segmenting may be used. The segmenting itself provides a surface or mesh for the anatomy. Alternatively, the located anatomy is used to create the mesh or surface.

The processor 20 is configured to create a model for three-dimensional printing from the segmented structure. The model may be created directly by fitting the model to the segmented structure. Cost functions or limitations on the fitting may be used to preserve 3D printing characteristics while shaping the anatomy portion to the patient. Alternatively, the processor determines a transform between the segmented structure and a template structure, such as a mesh derived from an average anatomy, anatomy of a different patient, or a model of anatomy. The transform is the warping or non-rigid distortion to convert the template structure into the patient specific structure. That transform is then applied to a model for three-dimensional printing. The model for three-dimensional printing is based on the template structure or mesh converted into a three-dimensional print model (e.g. orient, add base, add supporting structure, and/or optimize material usage). The model is transformed. The transformation warps the model for three-dimensional printing to simulate the segmented anatomy of the patient. The result is a transformed model for three-dimensional printing that represents the patient specific anatomy.

The processor 20 is configured to perform the segmentation and/or creation of the patient-specific model for three-dimensional printing free of user input during the segmentation and/or creation. The user initiates the process, such as causing the scan or loading the scan data. The user may also input the type of anatomy of interest, such as the liver or specific bone or group of bones. In response, the processor 20 performs the segmentation without input of seeds or other designations of location. The processor 20 creates the segmented surface, calculates the transform to the template anatomy, and applies the transform to the template model for three-dimensional printing without user input. The user may then refine the transformed or patient-specific model for three-dimensional printing or not. The model for three-dimensional printing is output by the processor 20 for printing.

In alternative embodiments, the user inputs information during the segmentation, creation, and/or transformations. For example, the user inputs seed points used in segmentation. As another example, the user selects specific templates from a library of templates to use. In another example, the user inputs an additional transformation, such as a targeted manipulation, to apply. The processor 20 uses the user input to guide or assist in segmenting, creating, and/or transforming.

The processor 20 may be configured to generate an image for display, such as display of the segmented anatomy. A three-dimensional rendering of the scan data for locations of the anatomy is generated. An image of the scan data without segmentation or using segmentation for relative highlighting may be generated. Alternatively or additionally, an image of the model for three-dimensional printing, such as using a computer assisted design program, may be generated.

The 3D printer 24 is any now known or later developed 3D printer. A reservoir of plastic, metal, or other material connects with a deposit head. Under the control of a controller, the deposit head and/or a support platform are moved to add successive material in layers, building up the three-dimensional construction until a physical model of the three-dimensional print construction is created. Any additive manufacturing system may be used.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for preparing for three-dimensional printing from medical scan data, the method comprising:

acquiring, from a medical imaging system, the scan data representing an anatomic structure of a patient;

creating a three-dimensional patient mesh of a surface of the anatomic structure of the patient;

calculating, by a processor, a transform between the three-dimensional patient mesh and a predetermined three-dimensional template mesh of the anatomic structure, the predetermined three-dimensional template mesh being based on another patient;

applying, by the processor, the calculated transform to a three-dimensional print model corresponding to the predetermined three-dimensional template mesh of the anatomic structure, resulting in a transformed three-dimensional print model; and outputting the transformed three-dimensional print model to a three-dimensional printer.

2. The method of claim 1 further comprising:
three-dimensionally printing the transformed three-dimensional print model.

3. The method of claim 1 wherein acquiring comprises acquiring the scan data as computed tomography, magnetic resonance, or ultrasound scan data with a computed tomography scanner, a magnetic resonance imaging system, or an ultrasound scanner, respectively.

4. The method of claim 1 wherein creating the three-dimensional patient mesh comprises segmenting the anatomic structure from the scan data.

5. The method of claim 4 wherein segmenting comprises segmenting the anatomic structure with a machine-learnt classifier for a type of anatomy of the anatomic structure.

6. The method of claim 1 wherein calculating the transform comprises calculating the transform as a non-rigid warping.

7. The method of claim 6 wherein calculating the transform as a non-rigid warping comprises calculating the transform with a thin plate spline.

8. The method of claim 1 wherein calculating the transform comprises warping the three-dimensional patient mesh to the three-dimensional template mesh of a same anatomy as the anatomic structure.

9. The method of claim 1 wherein applying the transform comprises warping the three-dimensional print model, the three-dimensional print model being created for three-dimensional printing of the three-dimensional template mesh.

10. The method of claim 1 wherein applying the transform comprises warping the three-dimensional print model in correspondence with warping of the three-dimensional template mesh to the three-dimensional patient mesh.

11. The method of claim 1 wherein applying comprises adjusting the three-dimensional print model for the anatomical structure of the patient.

12. The method of claim 1 wherein outputting comprises outputting the transformed three-dimensional print model with a base and orientation for three-dimensional printing and different than the anatomical structure of the patient.

13. The method of claim 1 further comprising:
transforming, based on a targeted manipulation, the three-dimensional patient mesh prior to the calculating or the transformed three-dimensional print model after applying, the targeted manipulation altering semantic parts of the anatomical structure to be three-dimensionally printed.

14. The method of claim 13 wherein transforming based on the targeted manipulation comprises simulating a facial expression or pathology.

15. A non-transitory computer readable storage medium having stored therein data representing instructions executable by a programmed processor for preparing for three-dimensional printing from medical scan data, the storage medium comprising instructions for:

warping between a patient-specific representation of anatomy as existing in a patient and a predetermined representation of the anatomy, the predetermined representation being based on another patient; and altering a three-dimensional print construction for the predetermined representation of the anatomy based on the warping, the three-dimensional print construction as altered representing the patient-specific representation of anatomy as existing in the patient and having a predetermined orientation for three-dimensional printing, wherein the three-dimensional print construction comprises a model representing the patient-specific anatomy converted to include an added base and the predetermined orientation for three-dimensional printing.

16. The non-transitory computer readable storage medium of claim 15, wherein warping comprises transforming a mesh of the patient specific representation.

17. The non-transitory computer readable storage medium of claim 15 wherein altering comprises altering the model to correspond to differences of the patient-specific representation from the predetermined representation.

18. The non-transitory computer readable storage medium of claim 15 further comprising also altering the three-dimensional print construction with a targeted manipulation deviating from the patient-specific representation of the anatomy.

19. A system for preparing for three-dimensional printing from medical scan data, the system comprising:
a medical imaging system configured to scan a patient; and
a processor configured to segment a structure of the patient from the scan and create a model for three-dimensional printing from the segmented structure, the segmentation and creation occurring free of user input during the segmentation and creation,
wherein the processor is configured to create the model by calculation of a transform between the segmented structure and a predetermined template structure of anatomy based on another patient and application of the calculated transform to a template for three-dimensional printing of the template structure of anatomy, the transformed template model comprising the model for three-dimensional printing.

* * * * *